United States Patent
Eriksson et al.

(10) Patent No.: US 10,477,485 B2
(45) Date of Patent: Nov. 12, 2019

(54) RADIO NETWORK NODE, USER EQUIPMENT AND METHODS THEREIN

(71) Applicant: Telefonaktiebolaget LM Ericsson (publ), Stockholm (SE)

(72) Inventors: Erik Eriksson, Linköping (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/861,891

(22) Filed: Jan. 4, 2018

(65) Prior Publication Data
US 2018/0146434 A1    May 24, 2018

Related U.S. Application Data

(63) Continuation of application No. 15/230,173, filed on Aug. 5, 2016, now Pat. No. 9,888,444, which is a (Continued)

(51) Int. Cl.
*H04W 52/14*    (2009.01)
*H04W 52/22*    (2009.01)
(Continued)

(52) U.S. Cl.
CPC ....... *H04W 52/146* (2013.01); *H04W 52/226* (2013.01); *H04W 52/242* (2013.01);
(Continued)

(58) Field of Classification Search
CPC ............. H04W 52/146; H04W 52/367; H04W 52/325; H04W 52/34; H04W 52/08; H04W 52/243; H04W 52/242; H04W 72/0413
(Continued)

(56) References Cited

U.S. PATENT DOCUMENTS 6,671,267 B1    12/2003 Yano et al.
2008/0188260 A1    8/2008 Xiao et al.
(Continued)

FOREIGN PATENT DOCUMENTS

JP    2002124933 A    4/2002
JP    2011151778 A    8/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.213 V10.4.0, Dec. 1, 2011, pp. 1-125, 3GPP, France.
(Continued)

*Primary Examiner* — Keith Ferguson
(74) *Attorney, Agent, or Firm* — Coats & Bennett, PLLC

(57) ABSTRACT

Some embodiments herein relate to method in a user equipment for determining a transmit power to be used by the user equipment when transmitting in a radio communications network, which user equipment is served by a radio network node in the radio communications network. The user equipment receives, from the radio network node, an indication indicating a set of power control parameters out of multiple sets of power control parameters, which multiple sets of power control parameters are stored at the user equipment. The user equipment determines a transmit power based on the indicated set of power control parameters.

8 Claims, 7 Drawing Sheets

Related U.S. Application Data continuation of application No. 14/397,711, filed as application No. PCT/SE2012/050458 on May 3, 2012, now Pat. No. 9,426,753.

(51) Int. Cl.
- *H04W 52/24* (2009.01)
- *H04W 52/38* (2009.01)
- *H04W 72/04* (2009.01)

(52) U.S. Cl.
CPC ....... *H04W 52/243* (2013.01); *H04W 52/386* (2013.01); *H04W 72/0446* (2013.01); *H04W 72/0473* (2013.01)

(58) Field of Classification Search
USPC ........ 455/522, 69, 68, 127.1, 500, 517, 508, 455/507, 515, 422.1, 403, 445, 550.1, 455/426.1, 426.2, 509, 450; 370/252, 370/310, 328, 329, 338, 343
See application file for complete search history.

(56) References Cited

U.S. PATENT DOCUMENTS

| | | |
|---|---|---|
| 2009/0117931 A1 | 5/2009 | Shin et al. |
| 2010/0167660 A1* | 7/2010 | Asanuma ............ H04W 52/242 455/67.13 |
| 2010/0331037 A1 | 12/2010 | Jen |
| 2011/0177837 A1 | 7/2011 | Chang et al. |
| 2011/0195735 A1 | 8/2011 | Irmer et al. |
| 2011/0235584 A1* | 9/2011 | Chen ....................... H04L 1/008 370/328 |
| 2011/0250899 A1 | 10/2011 | Vajapeyam et al. |
| 2012/0058797 A1* | 3/2012 | Gaal ................... H04W 52/228 455/522 |
| 2012/0257519 A1 | 10/2012 | Frank et al. |
| 2012/0289278 A1 | 11/2012 | Huschke et al. |
| 2012/0320820 A1 | 12/2012 | Yuda et al. |
| 2015/0126237 A1 | 5/2015 | Nagata et al. |

FOREIGN PATENT DOCUMENTS

| | | |
|---|---|---|
| JP | 2013197705 A | 9/2013 |
| WO | 2011054374 A1 | 5/2011 |
| WO | 2011114729 A1 | 9/2011 |

OTHER PUBLICATIONS

ETRI, "UE power control in heterogeneous networks", 3GPP TSG-RAN WG1 Meeting #63, Jacksonville, USA, Nov. 15, 2010, pp. 1-4, R1-106306, 3GPP, France.

* cited by examiner

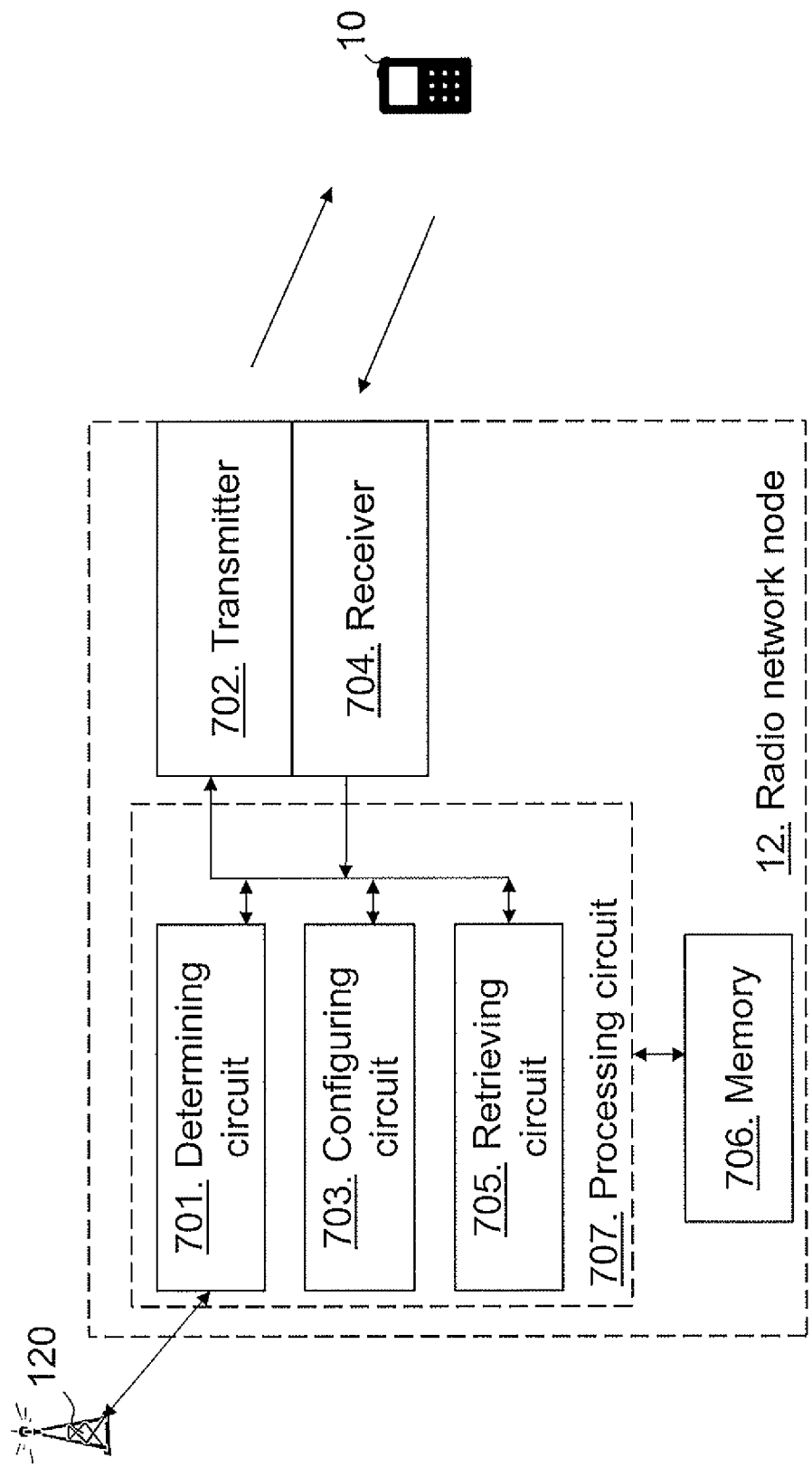

RADIO NETWORK NODE, USER EQUIPMENT AND METHODS THEREIN

RELATED APPLICATIONS

The present application is a continuation of U.S. application Ser. No. 15/230,173, filed Aug. 5, 2016, which is a continuation of U.S. application Ser. No. 14/397,711, filed Oct. 29, 2014, which is the national stage entry under 35 U.S.C. 371 of international application no. PCT/SE2012/050458, filed May 3, 2012, each of which applications are incorporated herein by reference in their entirety.

TECHNICAL FIELD

The embodiments herein relate to a radio network node, a user equipment and methods therein. In particular, embodiments herein relate to determine and to control transmit power to be used by the user equipment when transmitting in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area, the geographical area may be called a cell. The cell definition may also incorporate frequency bands used for transmissions, which means that two different cells may cover the same geographical area but using different frequency bands. User equipments (UE) are served by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In e.g. the LTE uplink user equipment transmit power control is applied in order to lower interference and reduce user equipment battery consumption. The power control formula for transmit or transmission power for uplink shared channel, $P_{PUSCH,c}(i)$ is described in Third Generation Partnership Project (3GPP) TS 36.213 Physical Layer procedures, v 10.4.0 section 5.1.1 where $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]
where,
$P_{CMAX,c}(i)$ is the configured user equipment maximum transmit power,
$M_{PUSCH,c}(i)$ is the bandwidth of the Physical Uplink Shared Channel (PUSCH) resource assignment expressed in number of resource blocks, this term compensates for varying assigned bandwidth, $P_{O\_PUSCH,c}(j)$ is a configurable power target, this parameter depends on j where j is set dependent on if the transmission relates to a normal transmission, a Semi Persistent Scheduling (SPS) transmission or an Random Access Response message,
$\alpha_c \in \{0, 0.4, 0.5, 0.6, 0.7, 0.8, 0.9, 1\}$ is a 3-bit parameter and relates to path-loss compensation, i.e. how much the user equipment should compensate its transmit power dependent on increasing/decreasing path-loss towards the radio base station,
$PL_c$ is the downlink path loss estimate,
$\Delta_{TF,c}(i) = 10 \log_{10}((2^{BPRE \cdot K_s}-1) \cdot \beta_{offset}^{PUSCH})$ is an offset dependent on if the transmission is a transmission only containing uplink control information or not,
$f_c(i)$ is a dynamic part controlled by power control commands sent in the grant on the downlink control channel. It can either be absolute commands or accumulative commands.

The user equipment transmit power is hence controlled by the radio communications network, e.g. a radio base station, with one slow component, configuring $P_{O\_PUSCH,c}(j)$ and $\alpha_c$, and one fast component in the power control commands $f_c(i)$. The different components may be used to provide a good received signal to interference and noise ratio (SINR) while keeping the interference to neighbouring cells low.

In 3GPP the potential introduction of more flexible Time Division Duplex (TDD) configurations has been assessed. In TDD the same frequency resources are used both for uplink and downlink transmissions where resources are divided between the links in time. The division is in LTE controlled by the eNodeB, i.e. the radio base station, which signals an uplink/downlink pattern to the user equipment, where the current standard supports configurations with from around 10% up to around 60% uplink. So far, the configuration is performed using system broadcast and is hence changed relatively slowly. If neighbouring cells use different TDD configurations so called eNodeB-to-eNodeB interference may occur in addition to UE-to-UE interference. eNodeB-to-eNodeB interference is the downlink transmission in one cell that will be seen as interference for a simultaneous uplink transmission, on the same frequency, in a different cell. This interference may in some deployments be many multitudes stronger than typical uplink interference stemming from other transmitting user equipments due to higher output power from a radio base station compared to a user equipment and also because of possibly different propagation conditions between radio base stations as compared to between user equipments and radio base stations. Put another way, during a 10 ms radioframe, for a given radio base station serving the user equipment, the UL subframes in which eNodeB-to-eNodeB interference occurs, due to the fact that another radio base station is using the same subframes for DL transmission, experience a higher level of interference and noise as compared to UL subframes for which there are no eNodeB-to-eNodeB interference since all radio base stations are using these subframes for UL transmissions.

In TDD systems the same frequency is used for both uplink and downlink transmissions. To protect the system from interference between uplink and downlink a guard period is inserted between uplink and downlink periods. This guard period when switching from downlink to uplink is set such that the user equipments will have time to switch from receiving to transmitting but also to be longer than the propagation delay from radio base station received with significant interfering power. In some special conditions the propagation properties may change such that transmissions of radio base stations from further away may be received with high power. In these cases the guard period may not have been set to a large enough value and high interference may then be experienced in the first uplink subframe, which first uplink subframe being the first in time UL subframe after a downlink/switching subframe.

There is also a possibility that there are multiple TDD carriers on adjacent frequencies in the same frequency band. For example, in the 2300-2400 MHz band, there may be multiple carriers, each using e.g. a 20 MHz bandwidth. Due to imperfect filtering, the different carriers cause interference to each other. For example, the downlink transmission on one carrier causes interference to the uplink reception on another carrier. At the radio base station receiver side, interference levels may then be higher during the subframes, where downlink transmission occurs on the adjacent carriers, as compared to the subframes, where also the adjacent carriers are used for uplink.

The UL/DL interference may also occur in case of Global Positioning System (GPS) sync failure in any neighbouring TDD cells. In this case, the unsynchronized radio base station may interfere with the other radio base station(s) and similar situations may occur.

There are possibilities also that Band 7, i.e. DL frequency band at 2620-2670 MHz and UL 2500-2570 MHz, Frequency Division Duplex (FDD) systems and band 38, i.e. frequency band of 2570-2620 MHz, TDD systems may experience similar problems due to adjacent channel interference. Hence, even for an FDD carrier, interference may be relatively high in certain subframes, where downlink transmissions occur on an adjacent carrier, as compared to other subframes, where no downlink but user equipment uplink transmissions occurs.

Currently, the radio base station configures the user equipment with power control parameters for the user equipment to use when determining, at the user equipment, transmit power for transmissions to the radio base station. The radio base station may then use e.g. the power command $f_c(i)$ to tune the transmit power of the user equipment. The power control parameters may be periodically updated and the power command $f_c(i)$ changes the transmit power in a rather slow manner. The types of interferences mentioned above introduce a rather drastic interference increase in some subframes, reducing the performance of the radio communications network.

SUMMARY

An object of embodiments herein is to minimize degradation of the performance in a radio communications network.

According to an aspect the object may be achieved by a method in a user equipment for determining a transmit power to be used by the user equipment when transmitting in a radio communications network. The user equipment is served by a radio network node in the radio communications network. The user equipment receives, from the radio network node, an indication indicating a set of power control parameters out of multiple sets of power control parameters. The multiple sets of power control parameters are stored at the user equipment. The user equipment then determines a transmit power based on the indicated set of power control parameters.

As the user equipment determines the transmit power based on the indication, the transmit power is controlled by the radio network node in a flexible and efficient manner. Thus, the degradation of the performance is reduced as the user equipment may perform drastic transmit power changes due to the feature of using the indication to determine the set of control parameters.

According to another aspect the object may be achieved by a method in the radio network node for controlling the transmit power of the user equipment in the radio communications network. As stated above, the radio network node serves the user equipment in the radio communications network. The radio network node determines the set of power control parameters to be used by the user equipment for determining transmit power of the user equipment. The radio network node further transmits the indication to the user equipment. The indication indicates the set of power control parameters out of multiple sets of power control parameters stored at the user equipment. The transmit power of the user equipment is thereby controlled.

According to yet another aspect the object may be achieved by a user equipment for determining a transmit power to be used by the user equipment when transmitting in the radio communications network. The user equipment is configured to be served by a radio network node in the radio communications network. The user equipment comprises a memory configured to have the multiple sets of power control parameters stored thereon. The user equipment further comprises a receiver configured to receive, from the radio network node, an indication indicating a set of power control parameters out of the stored multiple sets of power control parameters. Furthermore, the user equipment comprises a determining circuit configured to determine a transmit power based on the indicated set of power control parameters.

According to still another aspect the object may be achieved by a radio network node for controlling the transmit power of the user equipment in the radio communications network. The radio network node is configured to serve the user equipment in the radio communications network. The radio network node comprises a determining circuit configured to determine the set of power control parameters to be used by the user equipment for determining transmit power of the user equipment. The radio network node further comprises a transmitter configured to transmit the indication to the user equipment. The indication indicates the set of power control parameters out of multiple sets of power control parameters stored at the user equipment. The transmit power of the user equipment is thereby controlled by the radio network node.

Embodiments herein increase flexibility in transmit power setting by indicating the set of power control parameters to determine transmit power out of multiple sets of power control parameters. Thereby may the set of power control parameter be quickly changed and thus the transmit power enabling transmissions also in subframes with high interference levels or improved performance in subframes with less sensitivity to e.g. interference in neighbour cells.

BRIEF DESCRIPTION OF THE DRAWINGS

Embodiments will now be described in more detail in relation to the enclosed drawings, in which:

FIG. 7 is a block diagram depicting a radio network node according to embodiments herein.

DETAILED DESCRIPTION

Figure 1:
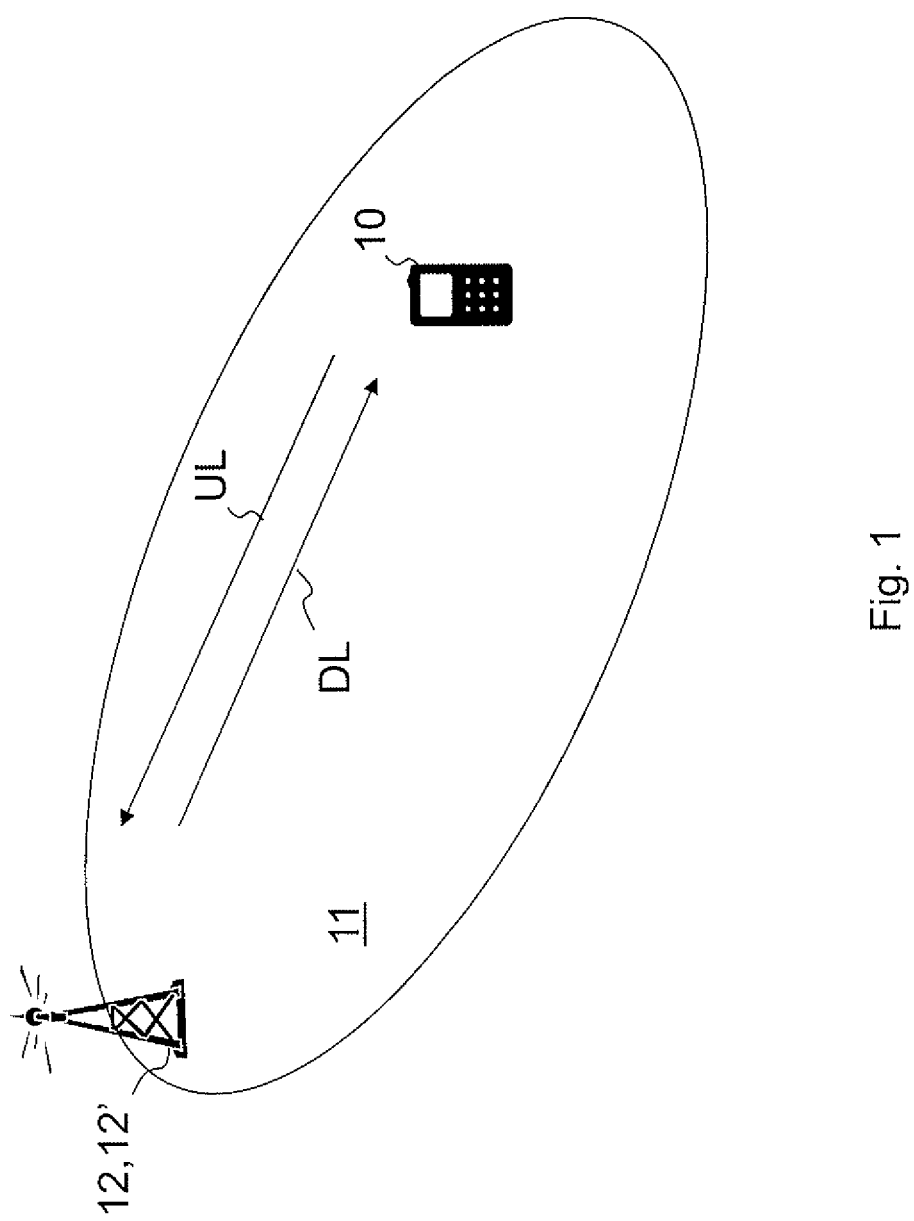
FIG. 1 is a schematic overview depicting a radio communications network according to embodiments herein.

FIG. 1 is a schematic overview depicting a radio communications network according to embodiments herein. The radio communications networks may use a number of different technologies, such as LTE, LTE-Advanced, WCDMA, GSM/EDGE, WiMax, or UMB or similar.

The radio communications network comprises a radio network node 12, exemplified herein as a radio base station 12', providing radio coverage over at least one geographical area, which geographical area may be referred to as a cell 11. The cell definition may also incorporate frequency bands used for transmissions. The radio base station 12' may also be referred to as e.g. a NodeB, an evolved Node B (eNB, eNode B), a base transceiver station, Access Point Base Station, base station router, or any other network unit capable to communicate with the user equipment 10 served by the radio base station 12' depending e.g. of the radio access technology and terminology used. The radio network node 12 will herein be exemplified as the radio base station 12' but may further comprise a relay node, a beacon node or similar.

A user equipment (UE) 10 is communicating with the radio base station 12'. The user equipment 10 transmits data over an air or radio interface to the radio base station 12' in uplink (UL) transmissions and the radio base station 12' transmits data over an air or radio interface to the user equipment 10 in downlink (DL) transmissions. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell.

In prior art good transmit power control is supported in situations where the required transmit power per resource block varies slowly with power control commands $f_c(i)$, for example up to 4 dB, between subframes used for transmission but it is not suited to handle large variations due to fast variation in interference levels or knowledge of how much harm the interference will cause in other cells. Specifically, in case some subframes suffer from e.g. severe eNodeB-eNodeB interference, whereas other subframes do not, a power control process, as described herein, which does take this into account will enhance the performance of the radio communications network. A particular case of interference variations are interference variations that are periodic with the duration of a radio frame. An example of this comprises the case where the first uplink subframe after the guard period at the switch from downlink to uplink always suffers from higher interference due to interference from a remote radio base station.

Embodiments herein increase the power control flexibility in order to handle large variations in wanted transmit power or transmission power. The radio base station 12' transmits an indication to the user equipment 10. The indication indicates a set of power control parameters out of multiple sets of power control parameters. The multiple sets of power control parameters are stored at the user equipment 10, e.g. in an internal or external memory, and the set of power control parameter is to be used by the user equipment 10 when determining transmit power at the user equipment 10. Thus, a rather large change in transmit power in some subframes may be signalled with just an indication.

The indication may be an explicit indication, such as an index of an indexed list of sets of power control parameters to use when transmitting in a scheduled subframe. Alternatively, the indication may be an implicit indication, such as an indication of a subframe to use; wherein the user equipment 10 is configured to use different power control parameters to determine transmit power for different subframes.

The set of power control parameters may comprise any one or any combinations of:

configured maximum transmit power $P_{CMAX,c}(i)$;

a target received power $P_{O\_PUSCH,c}(j)$, this parameter depends on j where j is set dependent on if the transmission relates to a normal transmission, an SPS transmission or an Random Access Response message;

a 3-bit parameter, $\alpha_c \in \{0, 0.4, 0.5, 0.6, 0.7, 0.8, 0.9, 1\}$, which relates to path-loss compensation, i.e. how much the user equipment should compensate its power dependent on increasing/decreasing path-loss towards the radio base station;

a power offset $\Delta_{TF,c}(i)$ dependent on if the transmission is a transmission only containing uplink control information or not, $\Delta_{TF,c}(i) = 10 \log_{10}((2^{BPRE \cdot K_s} - 1) \cdot \beta_{offset}^{PUSCH})$; and a dynamic part controlled by power control commands $f_c(i)$, which may be sent in the grant on the downlink control channel. It can either be absolute commands or accumulative; just to mention a few examples.

Thus, embodiments herein increase the power control flexibility in order to handle large variations in wanted transmit power. Some embodiments herein achieve the power control flexibility by a signaling method enabling the user equipment 10 to switch between multiple preconfigured power control parameters and the user equipment 10 may in some embodiments also switch between accumulated power control commands. In some embodiments, the flexibility is achieved by applying different power control parameters when determining transmit power, which power control parameters are dependent on subframe indices according to a preconfigured pattern. For example, the radio base station sends a grant for a first subframe, e.g. subframe index 4, and the user equipment 10 retrieves the set of power control parameters for that first subframe stored at the user equipment 10. A different set of power control parameters for other subframes, e.g. subframe indices 0-3 and 5-9, are also already stored at the user equipment 10 during configuration.

Figure 2:
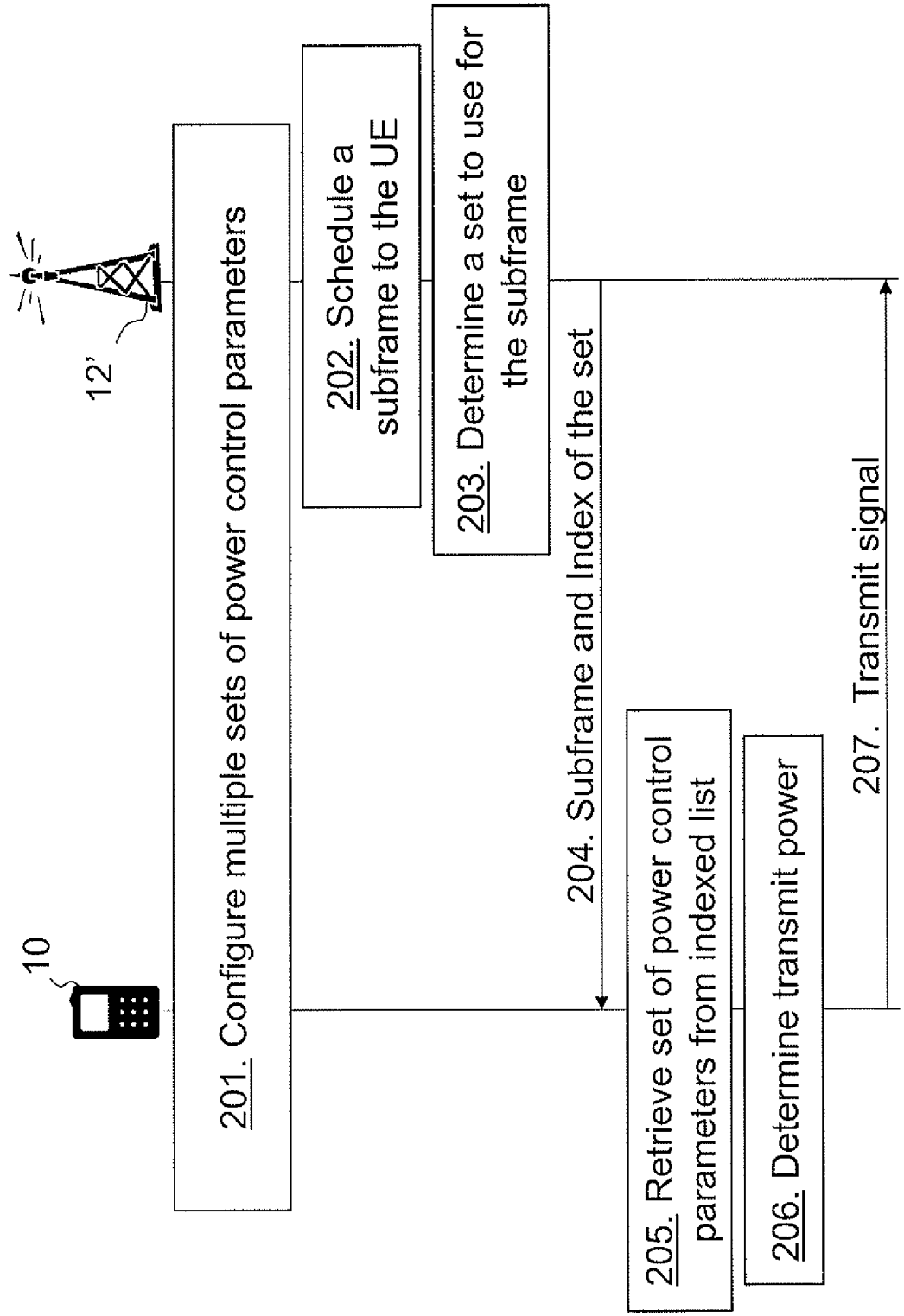
FIG. 2 is a schematic combined flowchart and signalling scheme according to some embodiments herein.

FIG. 2 is a schematic combined flowchart and signalling scheme according to some embodiments herein. FIG. 2 illustrates an explicit manner of signalling the set of power control parameters to use when applying transmit power at the user equipment 10 for transmission to the radio base station 12'. The illustrated embodiment enables an efficient signaling to switch between different sets of power control parameters e.g. in a stored list of different sets of power control parameters.

Action 201. The user equipment 10 is configured by the network, e.g. radio base station 12' or other network node, with multiple sets of power control parameters, also referred to as power control processes. This may be performed via higher layer signaling such as Radio Resource Control (RRC) signaling or similar. The radio base station 12' may e.g. signal or transmit to the user equipment 10 a first set of power control parameters A and a second set of power control parameters B. The first set of power control parameters A and the second set of power control parameters B may be used by the user equipment 10 when determining transmit power for transmissions to the radio base station 12'.

Action 202. The radio base station 12' schedules a radio resource such as a subframe to the user equipment 10 in response to an UL request or similar received from the user equipment 10.

Action 203. The radio base station 12' then determines a set of power control parameters to use for the scheduled subframe. E.g. the radio base station 12' may estimate or receive indication of interference in the subframe from a neighbouring cell. The radio base station 12' may then determine that it does not matter if the user equipment 10 transmits with full power in this subframe and selects a set of power control parameters indicating full transmit power. As a different example, the radio base station 12' estimates or detects interference from user equipments between cells and wants the user equipment 10 to reduce its transmit power. The radio base station 12' may then determine or select a set with power control parameters indicating a reduced transmit power. As alternative of additional embodiments, the radio base station 12' may determine that a load in the cell 11 is below a threshold and may determine a set of power control parameters for the user equipment 10 with no limits of the transmit power as the load is low, or the opposite.

Action 204. The radio base station 12' then transmits or signals the scheduled subframe and an indication to the user equipment 10 in e.g. an uplink grant message for a transmission using the scheduled subframe. The indication indicates what set of power control parameters to use when determining transmit power at the user equipment 10. The indication may be a pointer e.g. an index in an indexed list of sets of power control parameters. The radio base station 12' may also signal an absolute or accumulative power control command $f_c(i)$ in the uplink grant message or separate.

Action 205. The user equipment 10 may then retrieve set of the power control parameters indicated by the received indication from e.g. a stored indexed list.

Action 206. The user equipment 10 then determines transmit power based on the retrieved set of power control parameters and may also apply the power control command $f_c(i)$ if present.

Action 207. The user equipment 10 may then apply the determined transmit power for the granted signal transmission of the subframe. Thus, the user equipment 10 transmits e.g. a reference signal or a data transmission, with the determined transmit power.

For example, the radio base station 12' may transmit a grant for subframe x and indicate the second set of power control parameters B. The user equipment 10 may then use subframe x with a transmit power, which transmit power is based on the second set of power control parameters B.

As indicated above the transmit power may be determined from the formula $$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

In case of accumulative power control commands different accumulations are done for the different processes. For example, with multiple different accumulations $f_{c,0}(i)$, $f_{c,1}(i)$ ... where all processes are updated for each subframe according to $f_{c,n}(i)=f_{c,n}(i-1) \forall n$ unless a power control command indicating a selected process, x, is updated with the power control command value, $f_{c,x}(i)=f_{c,x}(i-1)+\rho$. Only the selected process $f_{c,x}(i)$ is then used in the formula.

Figure 3:
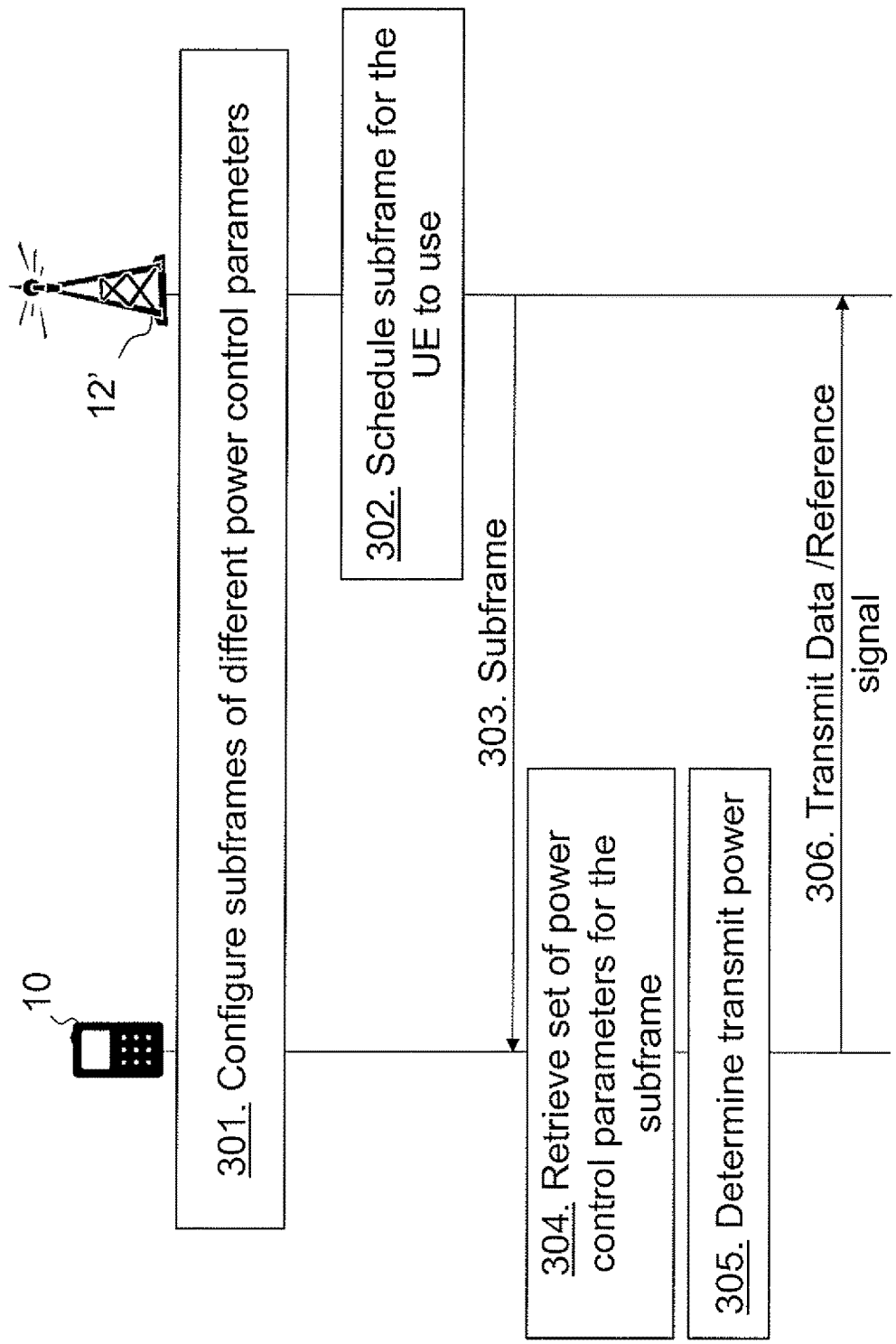
FIG. 3 is a schematic combined flowchart and signalling scheme according to some embodiments herein.

FIG. 3 is a schematic combined flowchart and signalling scheme according to some embodiments herein. FIG. 3 illustrates an implicit manner of signalling the set of power control parameters to use when determining transmit power at the user equipment 10. In these embodiments the power control parameters to use when determining transmit power is not signalled in the uplink grant message, instead is the user equipment 10 preconfigured with one or more subframes, such as a set of subframe indices, to apply a specific set of power control parameters for.

Action 301. The user equipment 10 may be configured by the network, e.g. radio base station 12' or other network node, with multiple sets of power control parameters, also referred to as power control processes. This may be performed via higher layer signaling such as Radio Resource Control (RRC) signaling or similar. E.g. the radio base station 12' may transmit or signal a first set of power control parameters S1 to the user equipment 10. This set may be used by default for of all subframes. However, the radio base station 12' may further transmit or signal another set of power control parameters S2 comprising one or more power control parameters, such as e.g. power offset, which is different than the previously configured set for a bit set S of subframes. The bit set S comprises bits indicating subframe numbers. The bit set S indicates for which certain subframes the user equipment 10 should apply the other set of power control parameters S2 comprising one or more power control parameters when determining transmit power. The bit set S may comprise one or more subframes. This configuration may be signaled from the radio base station 12', for example, using a bit set indicating for what subframe/s a set of power control parameters is valid.

Action 302. The radio base station 12' schedules a radio resource such as a subframe to the user equipment 10 in response to an UL request for resources or similar. It should be noted here that the scheduling is performed taking into account which set of power control parameters to use at the user equipment 10. Thus, action 302 corresponds to actions 202 and 203 in FIG. 2. As an example, a certain set of power control parameters may be used for certain subframes. The certain subframes may be subframes used in neighbouring cells to the cell 11 for downlink transmissions. Thereby, an eNodeB-to-eNodeB interference may occur for transmission in these certain subframes and one may increase performance by e.g. letting the user equipment 10 transmit with no limitations on transmit power in these certain subframes, since these are subframes already with high possible interferences.

Action 303. The radio base station 12' then transmits an uplink grant message indicating the scheduled subframe to the user equipment 10. The radio base station 12' may e.g. transmit the uplink grant message indicating to use a subframe x. This means that the set of power control parameters is implicitly indicated as the subframe x has a preconfigured set of power control parameter/s stored in a memory at the user equipment 10. The radio base station 12' may dynamically schedule different subframes to user equipments in the cell 11.

Action 304. The user equipment 10 retrieves the power control parameter or parameters, from the set of power control parameters, to be used when determining transmit power for the scheduled subframe. That is, the set of power control parameters is the one stored at the user equipment 10 related to the indicated subframe. E.g. if the subframe is in the bitset S the other set of power control parameters S2, such as a power offset, is used for that subframe. However, if the subframe is not in the bitset S the default set of power control parameters S1 is used.

Action 305. The user equipment 10 uses the retrieved power control parameters when determining transmit power to use e.g. when performing a data transmission using the scheduled subframe.

Action 306. The user equipment 10 may then transmit a data or reference signal towards the radio base station 12' by applying or using the determined transmit power.

Thus, the implicit indication performed in Action 303 may be signaled from the network, for example, using a bit set indicating for what subframe a set of power control parameters is valid. For example, the first set of power control parameters is used for certain uplink subframes and other sets of power control parameters are used for other subframes, for example, flexible subframes in LTE TDD systems implementing flexible TDD. The radio base station 12' may then implicitly signal or indicate what set of control parameters to apply by selecting a subframe to schedule transmissions from the user equipment 10 and transmit a grant for that subframe to the user equipment 10. The power control parameters to apply may e.g. comprise fixed pre-configured power offset, a whole set of new parameters or a different accumulated power control entity. The accumulated power control entity may also be same for the different sets of power control parameters.

As an example, each 1 ms subframe of a 10 ms radio frame may have its own set of power control parameters configured by higher layer signalling. More specifically, the power control parameter target received power, $P_{O\_PUSCH,c}(j)$, is configured separately for each UL subframe whereas other power control parameters and variables are shared between all subframes. Additionally or alternatively, the power control parameter Maximum (Allowed) Transmit power $P_{CMAX,c}(i)$ may be configured separately for each UL subframe, in order to avoid UE-to-UE interference between different cells or systems thereby reducing the maximum allowed transmit power.

An advantage of embodiments herein is to increase flexibility in uplink transmit power control enabling uplink transmissions also in subframes with high interference levels or improved performance in subframes with less sensitivity to interference in neighbour cells.

Figure 4:
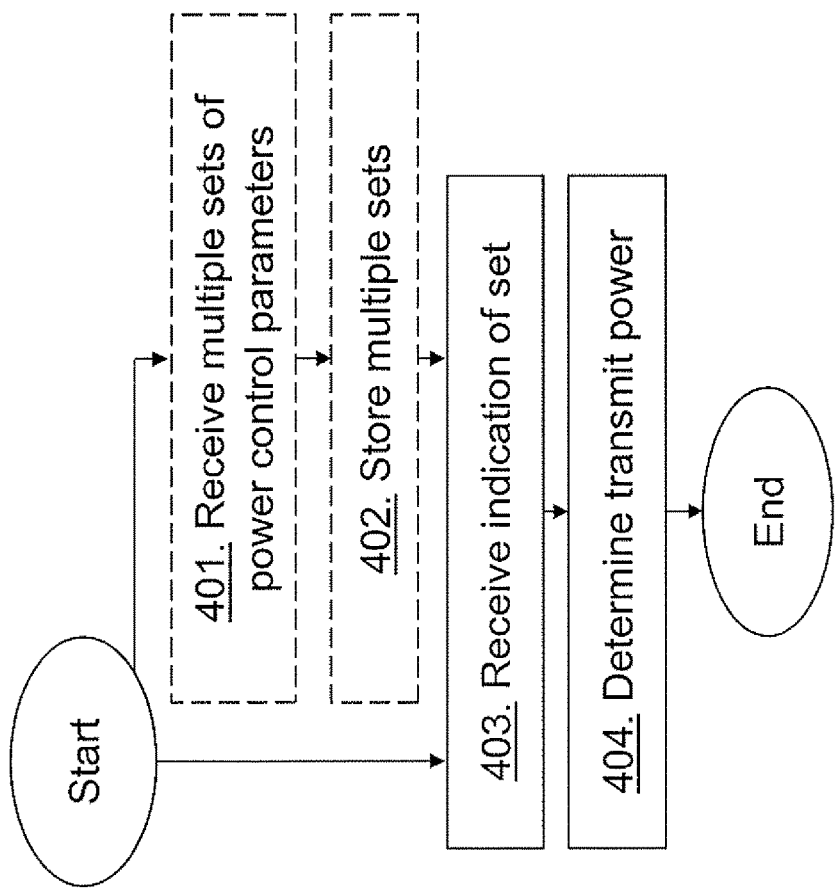
FIG. 4 is a flowchart depicting a method in a user equipment according to embodiments herein.

The method actions in the user equipment 10 for determining a transmit power to be used by the user equipment 10 when transmitting in a radio communications network, according to some general embodiments will now be described with reference to a flowchart depicted in FIG. 4. The user equipment 10 is served by the radio network node 12 in the radio communications network. The steps do not have to be taken in the order stated below, but may be taken in any suitable order. Actions merely performed in some embodiments are marked as dashed boxes.

Action 401. The user equipment 10 may receive the multiple sets of power control parameters from the radio network node 12 during configuration of the user equipment 10.

Action 402. The user equipment 10 may store the received multiple sets of power control parameters at the user equipment.

Action 403. The user equipment 10 receives, from the radio network node 12, an indication indicating a set of power control parameters out of multiple sets of power control parameters. The multiple sets of power control parameters are, as stated above, stored at the user equipment 10. The multiple sets of power control parameters may comprise a specific set of power control parameters to apply for one or more subframes, and wherein the indication indicates a subframe comprised in the one or more subframes. E.g. the indication may be a subframe with a preconfigured set of power control parameters being different than a default set of power control parameters. The set of power control parameters may comprise one or more power control parameters: such as a maximum transmit power; a target received power; a value indicating percentage of a pathloss that is to be taken into account when determining transmit power; a power offset value; and a power command value. Furthermore, the indication may be comprised in an uplink grant message. The indication may further e.g. be a pointer in a list of sets of power control parameters, wherein the pointer indicates in the list what set of power control parameter to apply by the user equipment 10 when determining the transmit power. E.g. the indication may be an index of an indexed list, wherein each index represents a set of power control parameters, such as a maximum transmit power or similar.

Action 404. The user equipment 10 determines the transmit power based on the indicated set of power control parameters. For example, the user equipment 10 determines transmit power using a formula defined as:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

where:
$P_{PUSCH,c}(i)$ is the transmit power for subframe i over a physical uplink shared channel;
$P_{CMAX,c}(i)$ is the maximum transmit power;
$M_{PUSCH,c}(i)$ is a bandwidth of a Physical Uplink Shared Channel resource assignment expressed in number of resource blocks;
$P_{O\_PUSCH,c}(j)$ is the target received power;
$\alpha_c \in \{0, 0.4, 0.5, 0.6, 0.7, 0.8, 0.9, 1\}$, and is the value indicating percentage of a pathloss that is to be taken into account when determining transmit power;
$PL_c$ is the downlink path loss estimate;
$\Delta_{TF,c}(i)$ is the power offset value; and
$f_c(i)$ is the power command value.

In some embodiments the user equipment 10 receives an accumulative power command. Then, the user equipment 10 determines to accumulate the accumulative power command with a previously used power command. The user equipment 10 may do different accumulations for different sets of power control parameters.

Figure 5:
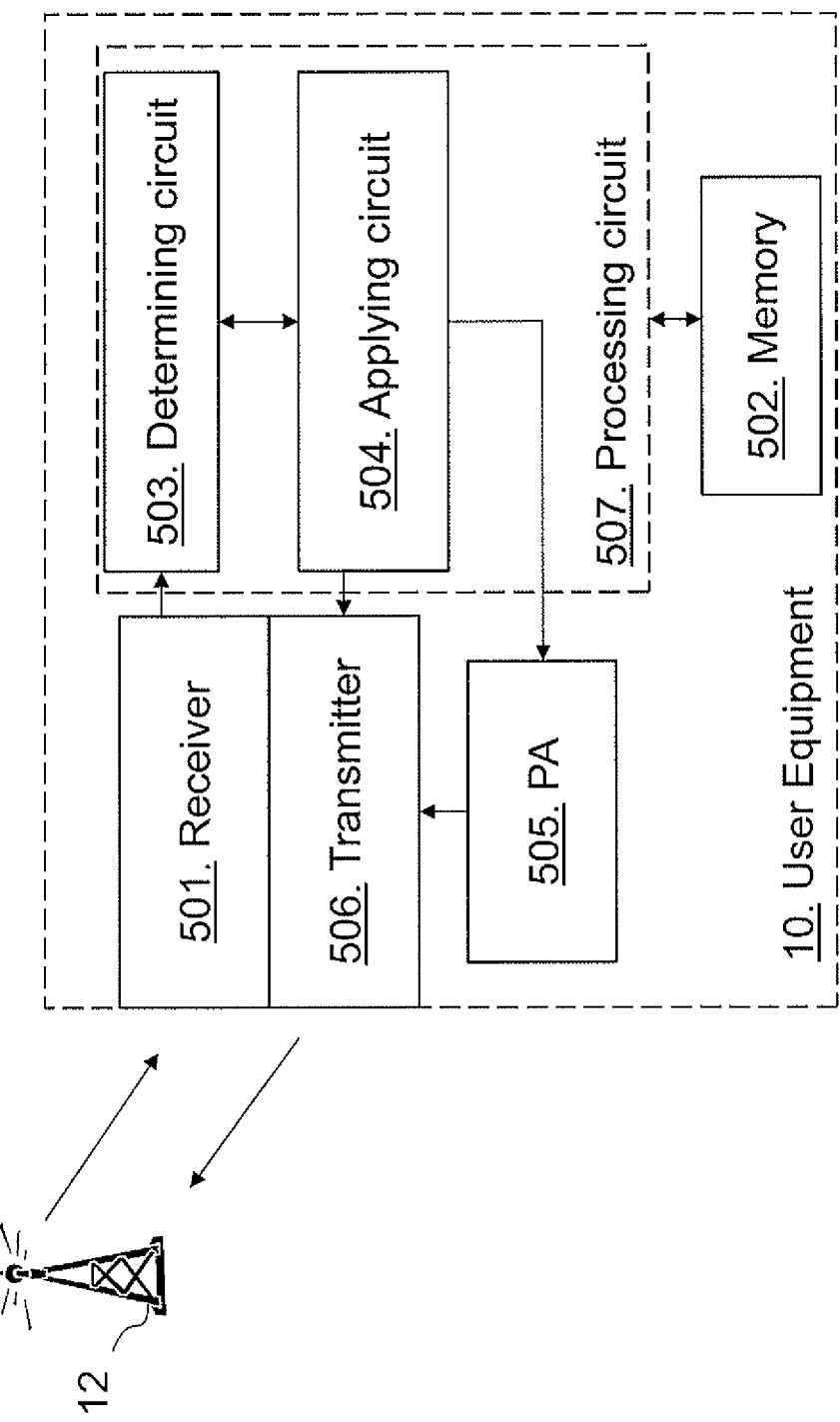
FIG. 5 is a block diagram depicting a user equipment according to embodiments herein.

FIG. 5 is a block diagram depicting a user equipment 10 for determining a transmit power to be used by the user equipment 10 when transmitting in the radio communications network. The user equipment 10 is configured to be served by the radio network node 12 in the radio communications network.

The user equipment 10 comprises a memory 502 configured to have the multiple sets of power control parameters stored thereon. The multiple sets of power control parameters may comprise a specific set of power control parameters to apply for one or more subframes, and wherein the indication indicates a subframe comprised in the one or more subframes.

The user equipment 10 further comprises a receiver 501 configured to receive, from the radio network node 12, an indication indicating a set of power control parameters out of the stored multiple sets of power control parameters. The set of power control parameters may, as stated above, comprise at least one of: a maximum transmit power; a target received power, a value indicating percentage of a pathloss that is to be taken into account when determining transmit power, a power offset value, and a power command value. In some embodiments the receiver 501 is further configured to receive the multiple sets of power control parameters from the radio network node 12 during configuration of the user equipment 10. Then the user equipment 10 is configured to store the multiple sets of power control parameters at the memory 502.

The user equipment 10 also comprises a determining circuit 503 configured to determine a transmit power based on the indicated set of power control parameters. The receiver 501 may be configured to receive an uplink grant message comprising the indication. The indication may be a pointer in a list of sets of power control parameters, and wherein the pointer indicates in the list what set of power control parameter to apply in the determining circuit 503. The determining circuit 503 may in some embodiments be configured to determine transmit power using a formula defined as $$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

where:
$P_{PUSCH,c}(i)$ is the transmit power for subframe i over a physical uplink shared channel;
$P_{CMAX,c}(i)$ is the maximum transmit power;
$M_{PUSCH,c}(i)$ is a bandwidth of a Physical Uplink Shared Channel resource assignment expressed in number of resource blocks;
$P_{O\_PUSCH,c}(j)$ is the target received power;
$\alpha_c \in \{0, 0.4, 0.5, 0.6, 0.7, 0.8, 0.9, 1\}$, and is the value indicating percentage of a pathloss that is to be taken into account when determining transmit power;
$PL_c$ is the downlink path loss estimate;
$\Delta_{TF,c}(i)$ is the power offset value; and
$f_c(i)$ is the power command value.

The receiver 501 may further be configured to receive an accumulative power command. Then the determining circuit 503 may be configured to accumulate the accumulative power command with a previously used power command, and to accumulate differently for different sets of power control parameters.

In addition, the user equipment 10 may comprise an applying circuit 504 configured to apply the determined transmit power for a transmission to the radio network node 12. The applying circuit 504 may be connected to a Power Amplifier (PA) 505 providing the transmit power when transmitting the transmissions, such as reference signals and/or data transmissions, via a transmitter 506.

The embodiments herein for applying transmit power for transmissions in the radio communications network may be implemented through one or more processors, such as a processing circuit 507 in the user equipment 10 depicted in FIG. 5, together with computer program code for performing the functions and/or method actions of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10. Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
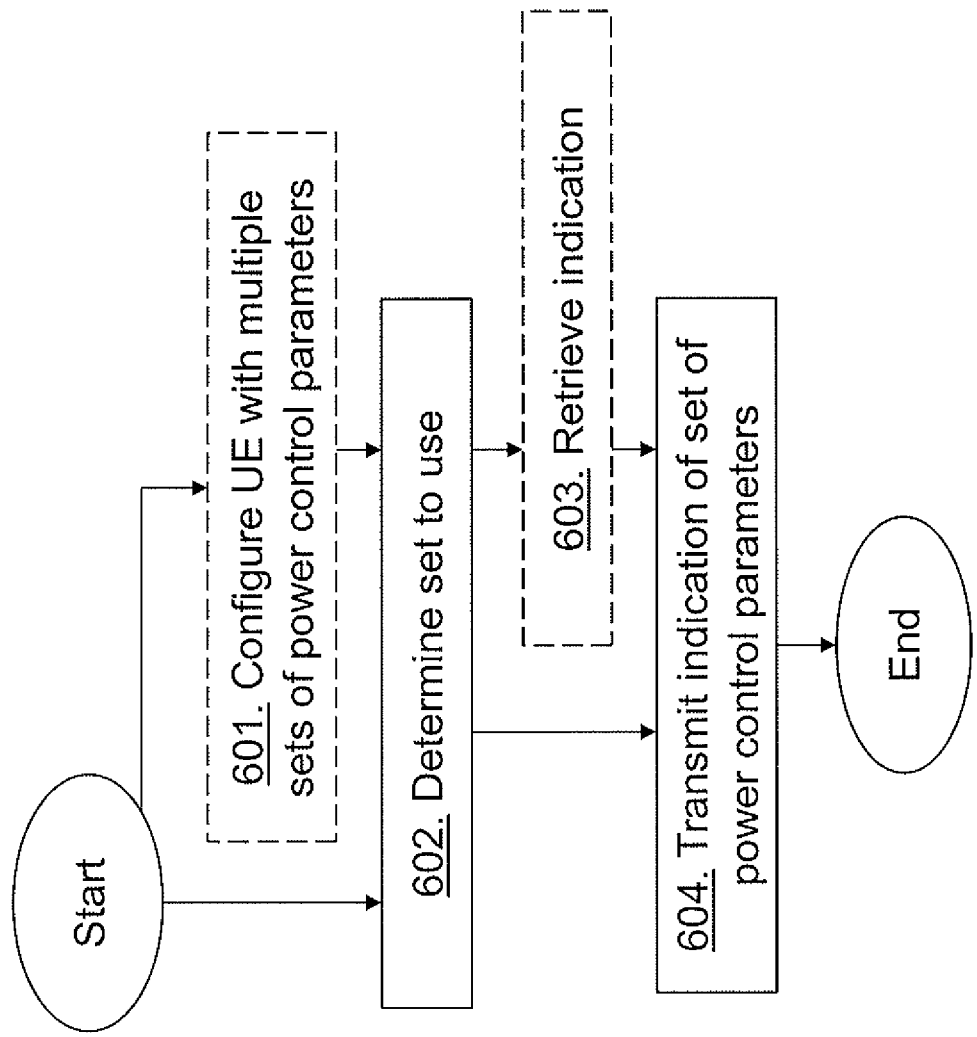
FIG. 6 is a flowchart depicting a method in a radio network node according to embodiments herein.

The method actions in the radio network node 12, exemplified above as the radio base station 12' in the figures, for controlling transmit power of the user equipment 10 in the radio communications network, according to some general embodiments will now be described with reference to a flowchart depicted in FIG. 6. The radio network node 12 serves the user equipment 10 in the radio communications network. The steps do not have to be taken in the order stated below, but may be taken in any suitable order. Actions merely performed in some embodiments are marked as dashed boxes.

Action 601. The radio network node 12 configures the user equipment 10 with the multiple sets of power control parameters by sending the multiple sets to the user equipment 10.

Action 602. The radio network node 12 determines the set of power control parameters to be used by the user equipment 10 for determining transmit power of the user equipment 10. The set of power control parameters may comprises at least one of: a maximum transmit power; a target received power, a value indicating percentage of a pathloss that is to be taken into account when determining transmit power, a power offset value, and a power command value. For example, the radio network node 12 may analyse an interference situation in the cell 11 serving the user equipment 10 and/or an interference situation in a cell neighbouring the cell 11. Based on this analysis the radio network node 12 determines the set of power control parameters. The interference situation may be discovered by reduced SNR values for certain subframes or similar. The analysis may indicate eNB-eNB interference, adjacent carrier interference, a UE-UE interference, or similar.

Action 603. The radio network node 12 may retrieve the indication indicating the determined power control parameter from a memory at the radio network node 12.

Action 604. The radio network node 12 transmits the indication to the user equipment 10. As stated above, the indication indicates the set of power control parameters out of multiple sets of power control parameters stored at the user equipment 10. The radio network node 12 thereby controls the transmit power of the user equipment 10. The multiple sets of power control parameters may e.g. be comprised in an indexed list stored at the radio network node 12 as well as at the user equipment 10, and wherein the indication is an index in the list. In some embodiments the multiple sets of power control parameters comprises a specific set of power control parameters to apply for one or more subframes, and the indication indicates a subframe comprised in the one or more subframes. For example, different subframes may have different configured power control parameters at the user equipment 10. Since the radio network node 12 knows this power control parameter/s for the different subframes, also configured at the radio network node 12, the radio network node 12 schedules a subframe with e.g. no restriction on transmit power, to the user equipment 10. The user equipment 10 then determines the transmit power based on the configured power control parameters of that subframe.

In some embodiments the radio network node 12 serves the user equipment 10 in the cell 11, also known as serving cell, and the one or more subframes is a subframe or subframes used for downlink transmissions in the cell 11 or a cell neighbouring the cell 11. These subframes may then be affected by so called eNodeB-to-eNodeB interference in addition to UE-to-UE interference, and this is taken into consideration when determining the set of power control parameters. Furthermore, the indication may be transmitted for granted subframes. The granted subframes experiences adjacent channel interference. This may indicate that the user equipment 10 should transmit with no transmit power restrictions or with power restrictions e.g. based on relevance of the transmission data.

The indication may be comprised in an uplink grant message. Then, the indication may be a pointer in a list of sets of power control parameters. The pointer indicates in the list what set of power control parameter to apply by the user equipment 10 when determining transmit power e.g. an index as stated above.

FIG. 7 is a block diagram depicting a radio network node for controlling a transmit power of the user equipment 10 in the radio communications network according to some embodiments herein. The radio network node 12 is configured to serve the user equipment 10 in the radio communications network.

The radio network node 12 comprises a determining circuit 701 configured to determine the set of power control parameters to be used by the user equipment 10 for determining transmit power of the user equipment 10. The determining circuit 701 may be configured to analyse an interference situation in the cell 11 serving the user equipment 10 and/or an interference situation in a cell neighbouring the cell 11. The cell neighbouring the cell 11 may be served by the radio network node 12 or a neighbouring network node 120.

The radio network node 12 further comprises a transmitter 702 configured to transmit the indication to the user equipment 10. The indication indicates the set of power control parameters out of the multiple sets of power control parameters stored at the user equipment 10. The transmit power of the user equipment 10 is thereby controlled by the radio network node 12. The multiple sets of power control parameters may comprise a specific set of power control parameters to apply for one or more subframes. The indication may then indicate a subframe comprised in the one or more subframes. In some embodiments the transmitter 702 is configured to transmit an uplink grant message comprising the indication. The indication may be a pointer in a list of sets of power control parameters, and the pointer indicates in the list what set of power control parameter to apply by the user equipment 10 when determining transmit power. The indication may be transmitted for granted subframes, which granted subframes experiences adjacent channel interference. This may be determined at the determining circuit 701.

Furthermore, the radio network node 12 may comprise a configuring circuit 703 adapted to configure the user equipment 10 with the multiple sets of power control parameters by sending the multiple sets to the user equipment 10 over the transmitter 702 but also receiving data, such as data signals from the user equipment indicating interference, transmit power or similar, over a receiver 704. The radio network node 12 may further be configured to serve the user equipment 10 in the cell 11, and the one or more subframes is a subframe or subframes used for downlink transmissions in the cell 11 or a cell neighbouring the cell 11. In some embodiments the set of power control parameters comprises at least one of: a maximum transmit power; a target received power, a value indicating percentage of a pathloss that is to be taken into account when determining transmit power, a power offset value, and a power command value.

The radio network node may further comprise a retrieving circuit 705 configured to retrieve the indication, e.g. retrieving the indication from a memory 706. The indication indicates the determined set of power control parameters from the memory 706 at the radio network node 12.

The embodiments herein for controlling the transmit power of the user equipment 10 in the radio communications network may be implemented through one or more processors, such as a processing circuit 707 in the radio network node 12 depicted in FIG. 7, together with computer program code for performing the functions and/or method actions of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12. Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the embodiments herein may be combined in any way. Embodiments herein are described for uplink data channel but may also be applied for another uplink transmission using power controls, e.g. Physical uplink control channel (PUCCH) and uplink sounding reference signal. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a user equipment for determining a transmit power to be used by the user equipment when transmitting in a radio communications network, wherein the user equipment is served by a radio network node in the radio communications network, the method comprising:

receiving, from the radio network node, an indication indicating a set of power control parameters out of multiple sets of power control parameters, wherein the multiple sets of power control parameters are stored at the user equipment; and determining the transmit power based on the indicated set of power control parameters; and wherein the receiving further comprises to receive an accumulative power command, wherein the determining comprises to accumulate the accumulative power command with a previously used power command, and wherein different accumulations are done for different sets of power control parameters;

wherein the set of power control parameters comprise at least one of: a maximum transmit power; a target received power, a value indicating percentage of a pathloss that is to be taken into account when determining transmit power, a power offset value, and/or a power command value; and wherein the determining comprises to determine transmit power using a formula defined as $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

where:

$P_{PUSCH,c}(i)$ is a transmit power for subframe i over a physical uplink shared channel;

$P_{CMAX,c}(i)$ is a maximum transmit power;

$M_{PUSCH,c}(i)$ is a bandwidth of a Physical Uplink Shared Channel resource assignment expressed in number of resource blocks;

$P_{O\_PUSCH,c}(j)$ is a target received power;

$\alpha_c \in \{0, 0.4, 0.5, 0.6, 0.7, 0.8, 0.9, 1\}$, and is a value indicating percentage of a pathloss that is to be taken into account when determining transmit power;

$PL_c$ is a downlink path loss estimate;

$\Delta_{TF,c}(i)$ is a power offset value; and $f_c(i)$ is a power command value.

2. The method according to claim 1, wherein the multiple sets of power control parameters comprise a specific set of power control parameters to apply for one or more subframes, and wherein the indication indicates a subframe comprised in the one or more subframes.

3. The method according to claim 1, wherein:

the indication is comprised in an uplink grant message;

the indication is a pointer in a list of sets of power control parameters; and the pointer indicates in the list what set of power control parameter to apply by the user equipment when determining transmit power.

4. The method according to claim 1, further comprising:

receiving the multiple sets of power control parameters from the radio network node during configuration of the user equipment; and storing the received multiple sets of power control parameters at the user equipment.

5. A user equipment for determining a transmit power to be used by the user equipment when transmitting in a radio communications network, wherein the user equipment is configured to be served by a radio network node in the radio communications network, wherein the user equipment comprises:

a memory configured to have multiple sets of power control parameters stored thereon;

a receiver configured to receive, from the radio network node, an indication indicating a set of power control parameters out of the stored multiple sets of power control parameters; and a determining circuit configured to determine a transmit power based on the indicated set of power control parameters; and wherein the receiver is further configured to receive an accumulative power command, and wherein the determining circuit is configured to accumulate the accumulative power command with a previously used power command, and to accumulate differently for different sets of power control parameters;

wherein the set of power control parameters comprise at least one of: a maximum transmit power; a target received power, a value indicating percentage of a pathloss that is to be taken into account when determining transmit power, a power offset value, and/or a power command value; and wherein the determining circuit is configured to determine transmit power using a formula defined as $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

where:

$P_{PUSCH,c}(i)$ is a transmit power for subframe i over a physical uplink shared channel;

$P_{CMAX,c}(i)$ is a maximum transmit power;

$M_{PUSCH,c}(i)$ is a bandwidth of a Physical Uplink Shared Channel resource assignment expressed in number of resource blocks;

$P_{O\_PUSCH,c}(j)$ is a target received power;

$\alpha_c \in \{0, 0.4, 0.5, 0.6, 0.7, 0.8, 0.9, 1\}$, and is a value indicating percentage of a pathloss that is to be taken into account when determining transmit power;

$PL_c$ is a downlink path loss estimate;

$\Delta_{TF,c}(i)$ is a power offset value; and $f_c(i)$ is a power command value.

6. The user equipment according to claim 5, wherein the multiple sets of power control parameters comprise a specific set of power control parameters to apply for one or more subframes, and wherein the indication indicates a subframe comprised in the one or more subframes.

7. The user equipment according to claim 5, wherein the receiver is configured to receive an uplink grant message comprising the indication, wherein the indication is a pointer in a list of sets of power control parameters, and wherein the pointer indicates in the list what set of power control parameter to apply in the determining circuit.

8. The user equipment according to claim 5, wherein the receiver is further configured to receive the multiple sets of power control parameters from the radio network node during configuration of the user equipment; and the user equipment is configured to store the multiple sets of power control parameters at the memory.

* * * * *